United States Patent
Miyamoto et al.

(10) Patent No.: US 6,256,457 B1
(45) Date of Patent: *Jul. 3, 2001

(54) CAMERA HAVING A VIBRATION COMPENSATION DEVICE AND A STROBE EMITTING DEVICE

(75) Inventors: Hidenori Miyamoto, Urayasu; Tatsuo Amanuma, Ageo; Toshiyuki Nakamura, Tokyo, all of (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/799,530

(22) Filed: Feb. 13, 1997

Related U.S. Application Data

(63) Continuation of application No. 08/609,004, filed on Feb. 29, 1996, now abandoned, which is a continuation of application No. 08/377,963, filed on Jan. 25, 1995, now abandoned.

(30) Foreign Application Priority Data

Apr. 12, 1994 (JP) .................................................. 6-097059

(51) Int. Cl.[7] ........................... G03B 17/00; G03B 15/03; G03B 7/26

(52) U.S. Cl. .............................. 396/52; 396/155; 396/205
(58) Field of Search ................................ 396/52–55, 155, 396/205

(56) References Cited

U.S. PATENT DOCUMENTS

| | | | | |
|---|---|---|---|---|
| 5,084,724 | * | 1/1992 | Maeno ................................. | 354/430 |
| 5,130,739 | * | 7/1992 | O'Such et al. ........................ | 354/423 |
| 5,153,633 | * | 10/1992 | Otani ..................................... | 396/55 |
| 5,235,378 | * | 8/1993 | Tominaga et al. ................... | 354/412 |
| 5,266,981 | * | 11/1993 | Hamada et al. ..................... | 354/400 |
| 5,353,091 | * | 10/1994 | Ishida et al. ......................... | 354/410 |
| 5,539,496 | * | 7/1996 | Wakabayashi et al. .............. | 354/430 |
| 5,758,202 | * | 5/1998 | Amanuma et al. ................... | 396/55 |

* cited by examiner

Primary Examiner—Christopher E. Mahoney

(57) ABSTRACT

A camera equipped with a vibration detection unit which detects vibrations in the camera, a vibration compensation unit which performs vibration compensation based on the vibration detection signals of the vibration detection unit, and a strobe emitting unit which emits photographic fill-in light. A control unit is provided that prohibits charging of the strobe battery while the vibration detection unit is operating. In addition, when it has been determined that photographic fill-in light is needed, and the vibration detection unit is operating, and when the strobe battery is uncharged, the operation of the vibration detection unit is stopped.

11 Claims, 5 Drawing Sheets

CAMERA HAVING A VIBRATION COMPENSATION DEVICE AND A STROBE EMITTING DEVICE

This application is a continuation of application Ser. No. 08/609,004, filed Feb. 29, 1996, now abandoned, which is a continuation of 8/377,963 filed Jan. 25, 1995.

BACKGROUND OF THE INVENTION

1. Field of the Invention

The present invention relates to a camera having a vibration compensation device which compensates for image blur produced by shaking or vibrating the camera, and in particular, relates to a to camera having a vibration compensation device which is equipped with a strobe emitting device, a strobe battery, and a strobe charging device.

2. Description of the Related Art

In known cameras, various parts and units are electronic and highly automated, for example autoexposure (AE) mechanisms and autofocus (AF) mechanisms. Another example of an electronic and highly automated function is a vibration compensation device for reducing image blur caused by camera vibration, such as vibrations which occur during hand-held photography. Various vibration compensation devices have been proposed which attempt to compensate for the image blur which occurs when the camera sways, and, particularly when the camera tilts. These known vibration compensation devices are typically activated when a shutter release button is pressed halfway, and use an angular velocity sensor, as a vibration detection unit, to detect vibrations by obtaining the angular velocity of the camera vibration, and thereafter shift a vibration compensation lens system according to the detected vibrations. The vibration compensation lens system, which may encompass all or part of a main optical system in a photographic lens system, is typically shifted in a direction perpendicular to the optical axis and opposite to the detected vibrations. Thus, even in an exposure where the camera shutter speed is slower than that of normal photography, photographs can be taken without image blur.

A problem in using this type of vibration compensation device is that the accuracy of the vibration compensation depends on the photographic operating conditions of the camera. In known cameras which do not have a vibration compensation device and which have a built-in strobe emission unit, when the shutter release button is pressed halfway, photometry and rangefinding are performed, and a strobe battery is charged when it is determined that strobe emission photography is required and that the condenser which comprises the strobe battery is not charged. However, in cameras which have a vibration compensation device and a built-in strobe emission unit, when the determination is made that the strobe battery is uncharged, and the charging operation is started, there is a danger that the operation of the vibration detection unit will malfunction when the source voltage in the control circuit system inside the camera drops. When the source voltage drops in known cameras having a strobe emission unit and a vibration compensation device, the vibration detection unit tends to output erroneous vibration detection signals. This, in turn, creates erroneous movement of the vibration compensation lens system which can increase image blur.

There exists a need for a camera having a vibration compensation system and a strobe battery, or a condenser having a limited capacity, which is housed inside the camera, in which it is possible to operate both the vibration compensation device and the strobe emission unit at the same time and without error.

SUMMARY OF THE INVENTION

Accordingly, it is an object of the present invention to provide a camera with a vibration compensation device which does not malfunction when a charging operation of a strobe battery is started.

It is another object of the invention to provide a camera in which charging of a strobe battery is prevented during vibration detection, or alternatively when charging of the strobe battery is performed during vibration detection, and vibration detection is interrupted, the exposure operation is halted.

It is a further object of the present invention to provide a vibration compensation device which does not malfunction if a charging operation is started to charge an uncharged strobe battery.

Additional objects and advantages of the invention will be set forth in part in the description which follows, and, in part, will be obvious from the description, or may be learned by practice of the invention.

Objects of the present invention are achieved in a camera comprising a vibration compensation device which compensates for vibrations in the camera; a strobe emitting device which produces a fill-in light; a strobe battery, connected to the strobe emitting device, to supply power to the strobe emitting device; and a control unit to activate the vibration compensation device and the strobe emitting device, the control unit preventing the strobe battery from charging when the vibration compensation device has been activated.

Objects of the present invention are also achieved in a method of charging a strobe battery for a camera comprising sensing vibrations in a camera, compensating for vibrations of a camera, and stopping sensing vibrations when a strobe battery is being charged.

Objects of the present invention are also achieved in a camera with a vibration compensation device which performs vibration compensation based on vibration detection signals from a vibration detection unit, a strobe-emitting device, which emits photographic fill-in light, and a control device which prohibits charging of a strobe battery while the vibration detection device is operating.

Objects of the present invention are also achieved in a camera having a vibration detection unit, a strobe emission device, a photometric device which measures the subject brightness for determining the exposure, and a control unit that, while a vibration detection unit is operating, stops the operation of the vibration detection unit when photographic fill-in light is needed and when the strobe battery is uncharged.

Objects of the present invention are also achieved in a camera with a vibration compensation device that uses a vibration detection unit having an operation stop command signal generating device as a vibration start signal generating device.

Objects of the present invention are also achieved in a method of flash-photography for a camera comprising detecting vibrations when a release button is pressed halfway, performing photometry and rangefinding, and stopping the detecting of vibrations when a strobe mode is in effect and a strobe battery is started charging.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
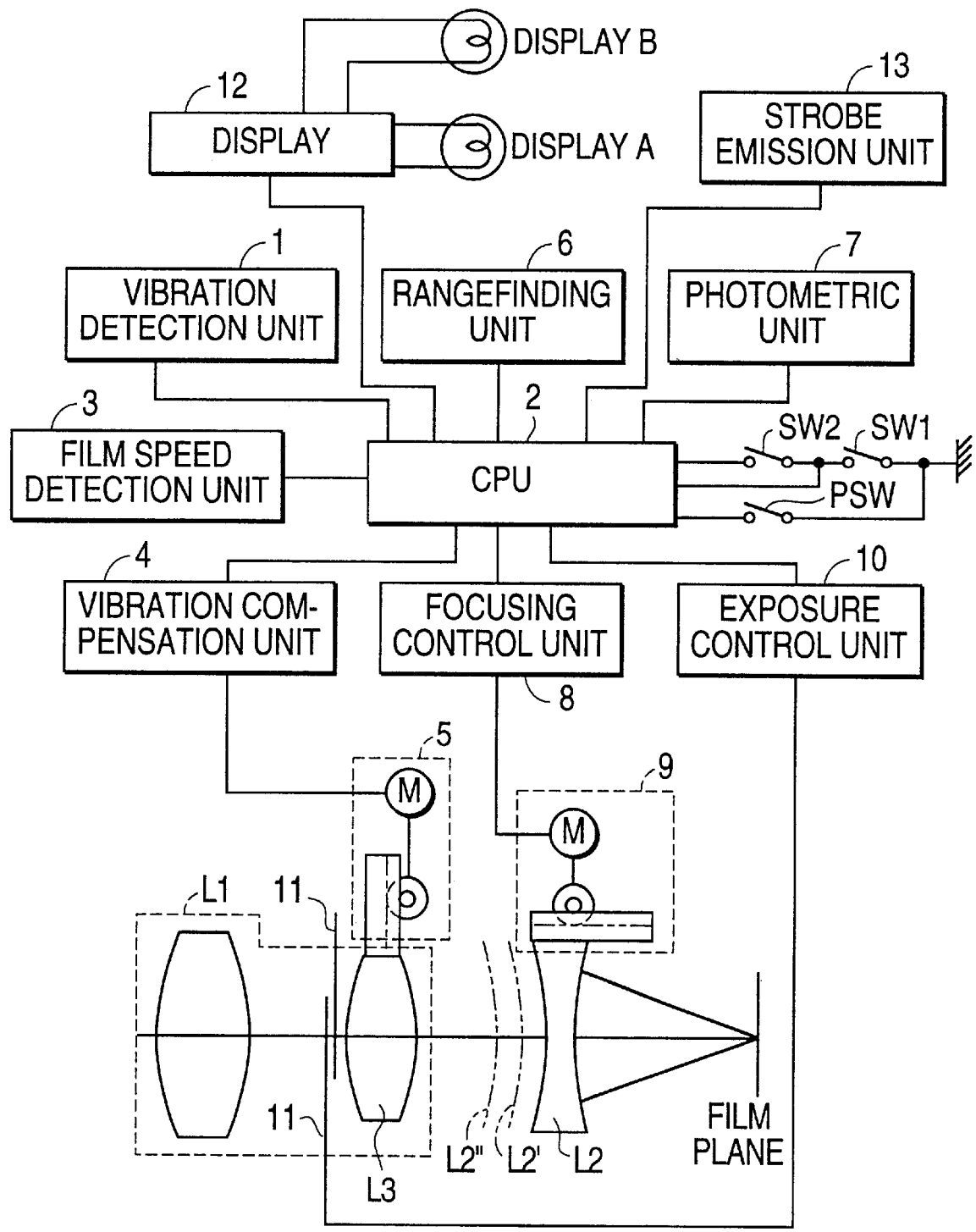
FIG. 1 is a block diagram of a camera with a vibration compensation device in accordance with a preferred embodiment of the present invention.
Figure 2:
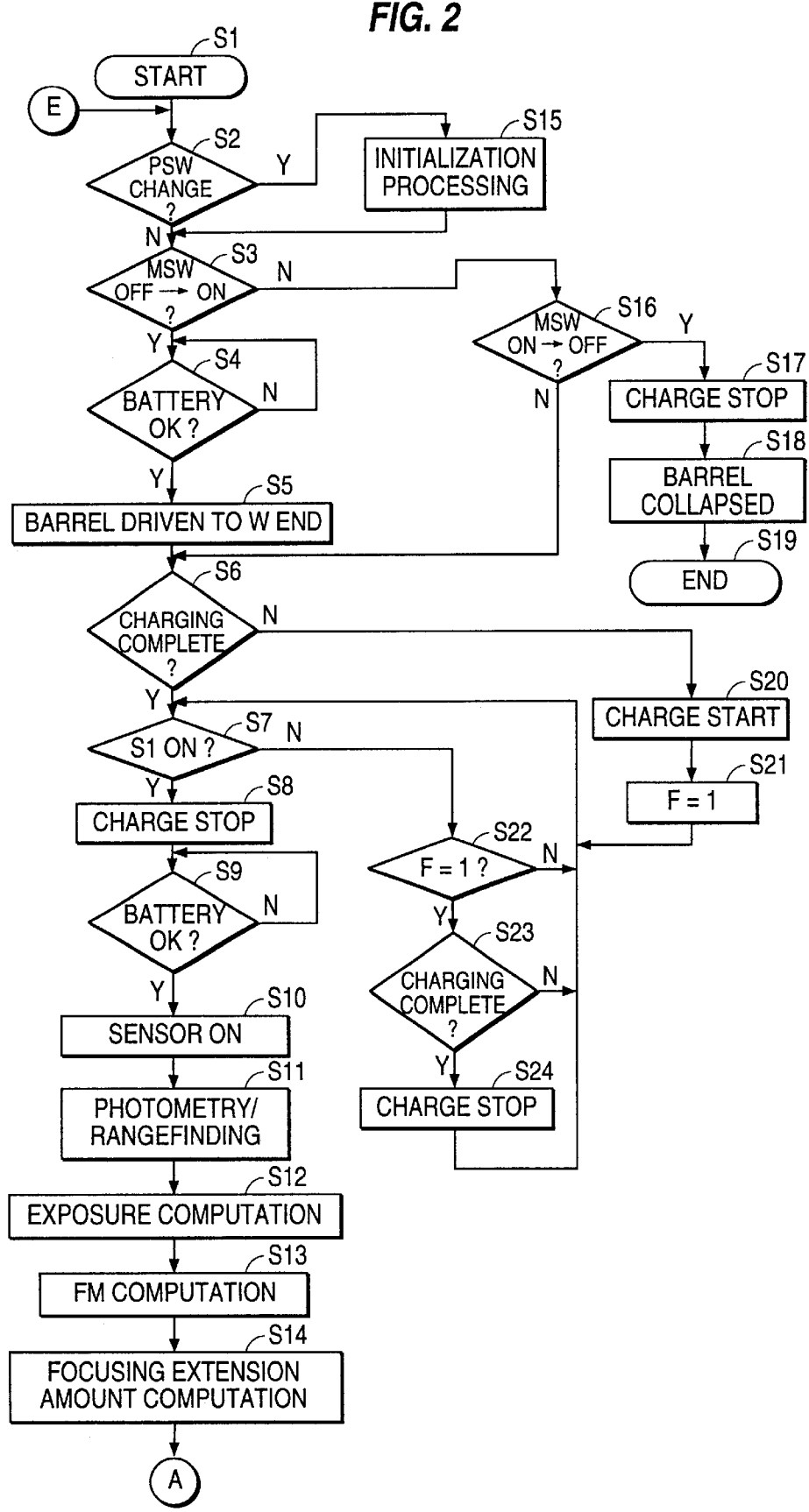
FIG. 2 is a flow chart which shows the operation sequence of a CPU in a camera with a vibration compensation device in accordance with a preferred embodiment of the present invention.

Reference will now be made in detail to the present preferred embodiments of the present invention, examples of which are illustrated in the accompanying drawings, wherein like reference numerals refer to like elements throughout.

FIG. 1 is a block diagram of a camera with a vibration compensation device in accordance with a preferred embodiment of the present invention. The vibration compensation device generally comprises a vibration detection unit 1, a vibration compensation unit 4, a CPU 2, a drive system 5, and a vibration compensation optical system L3.

A switch SW1, connected to the CPU 2 positioned inside a camera body (not shown), is operated by the manipulation of an external member, for example, a half-pressing of a shutter release button (not shown) connected at the upper end of the camera body. The vibration detection unit 1, for detecting vibrations of the camera, is connected to the CPU 2, which operates as a vibration detection control unit. When the switch SW1 is turned ON, the CPU 2 activates the vibration detection unit 1, and after a specified period of time has elapsed, the vibration amount detection unit 1 outputs a signal indicative of the vibrations of the camera.

A switch SW2, connected to the CPU 2, is operated by the manipulation of an external member, for example, a full-pressing of the shutter release button. The vibration compensation unit 4, connected to the CPU 2, is positioned inside the camera body. When the switch SW2 is turned ON, the CPU 2 commands the vibration compensation unit 4 to compensate for the vibrations detected by the vibration detection unit 1. The vibration compensation unit 4 compensates for vibrations, which would produce image blur on an image plane, by driving the vibration compensation optical system L3, which is part of a photographic optical system L1, via the drive system 5, in a direction which is perpendicular to the optical axis of the photographic optical system L1.

A switch PSW acts as a battery supply switch, and alternates between an "H" and an "L" position.

A known film speed detection unit 3 is connected to the CPU 2 and detects the ISO speed of the film (not shown) housed in the camera body. A known rangefinding unit 6, which measures the distance to the subject, and a known photometric unit 7, which measures the subject brightness are also connected to the CPU 2. When the switch SW1 is turned ON, the CPU 2 activates the rangefinding unit 6 to execute rangefinding and the photometric unit 7 to execute photometry.

A focusing control unit 8, controlled by the CPU 2, autofocuses a focusing optical system in response to the output signal of the rangefinding unit 6 by a known method. The focusing control unit 8 drives the focusing optical system L2 along the optical axis, as shown by positions L2' and L2", via a drive system 9.

An exposure control unit 10, controlled by the CPU 2, controls an aperture member 11, to expose a film on a film plane, in response to the output signal of the photometric unit 7 and the film speed detection unit 3.

A display 12, for displaying the photographic operation status of the camera, is equipped with a lamp display A and a lamp display B. By manipulating the lamp displays A and B, such as by lighting or blinking, indications for example that vibration detection is in progress or that strobe charging is in progress, are given to the photographer.

A strobe emission unit 13 is connected to the CPU 2 and emits photographic fill-in light when strobe emission photography is required. The strobe emission unit 13 is powered by a strobe battery (not shown), which preferably comprises a condenser.

FIGS. 2 through 5 are flow charts for explaining the operating procedure of the CPU 2 in a camera with a vibration compensation device in accordance with the preferred embodiment of the present invention.

The operating procedure starts in step S1. In step S2, a determination is made as to whether the switch PSW has changed positions between [H] and [L]. If the switch PSW has changed position, an initialization process is carried out in step S15, thereafter the operation proceeds to step S3. If the switch PSW has not changed positions in step S2, the operation proceeds directly to step S3.

In step S3, a determination is made as to whether a switch MSW (the main power switch of the camera) has been turned ON. If the switch MSW has been turned ON, the source voltage of the camera battery is checked in step S4. If the switch MSW has not been turned ON in step S3, the operator proceeds to step S16 and it is determined whether the switch MSW has been turned OFF. If the switch MSW has been turned OFF, the charge of the strobe battery is stopped in step S17, a zoom lens barrel comprising the photographic optical system is collapsed in step S18 and the operation is stopped in step S19. If in step S16 the switch MSW was not turned OFF the operator proceeds to step S6.

Once the battery is OK in step S4, the zoom lens barrel is driven to the wide ("W")end in step S5. If the camera has a collapsible single-focus lens, it is driven to the focusing preparation position.

In step S6 it is determined whether the strobe battery, such as a strobe emission condenser, is charged. If the charging of the strobe battery is completed in step S6, the operation proceeds to step S7. If the charging of the strobe battery is not complete, the operation proceeds to step S20, charging is started in step S20, thereafter a flag F is set to "1" in step S21, and the operation proceeds to step S7.

In step S7, it is determined whether the switch SW1, abbreviated as S1 in FIGS. 1–4, is ON. If the switch SW1 is ON, the charging which was started in step S20 is stopped in step S8. If, in step S7 the switch SW1 is OFF, the operation proceeds to step S22 and if the flag F is set to "1," charging has started, and the operation proceeds to step S23. In step S23 it is determined whether the charging of the strobe battery is complete. If the charging is complete, the operation proceeds to step 24 in which charging is stopped. Thereafter, the operation returns to step S7. If, in step S23, the charging is not complete, the operation returns directly to step S7.

In step S9, the source voltage of the battery is checked, and if the source voltage is OK, the vibration detection unit 1 ("SENSOR") is activated in step S10. Thereafter, in step S11, photometry and rangefinding are performed, followed by exposure computation in step S12 and FM (flashmatic) computation in step S13. The flashmatic computation involves setting the exposure for use with the flash. In general, an expousre valve and a flash firing timing are calculated based on an aperture valve and the distance to the object.

Figure 3:
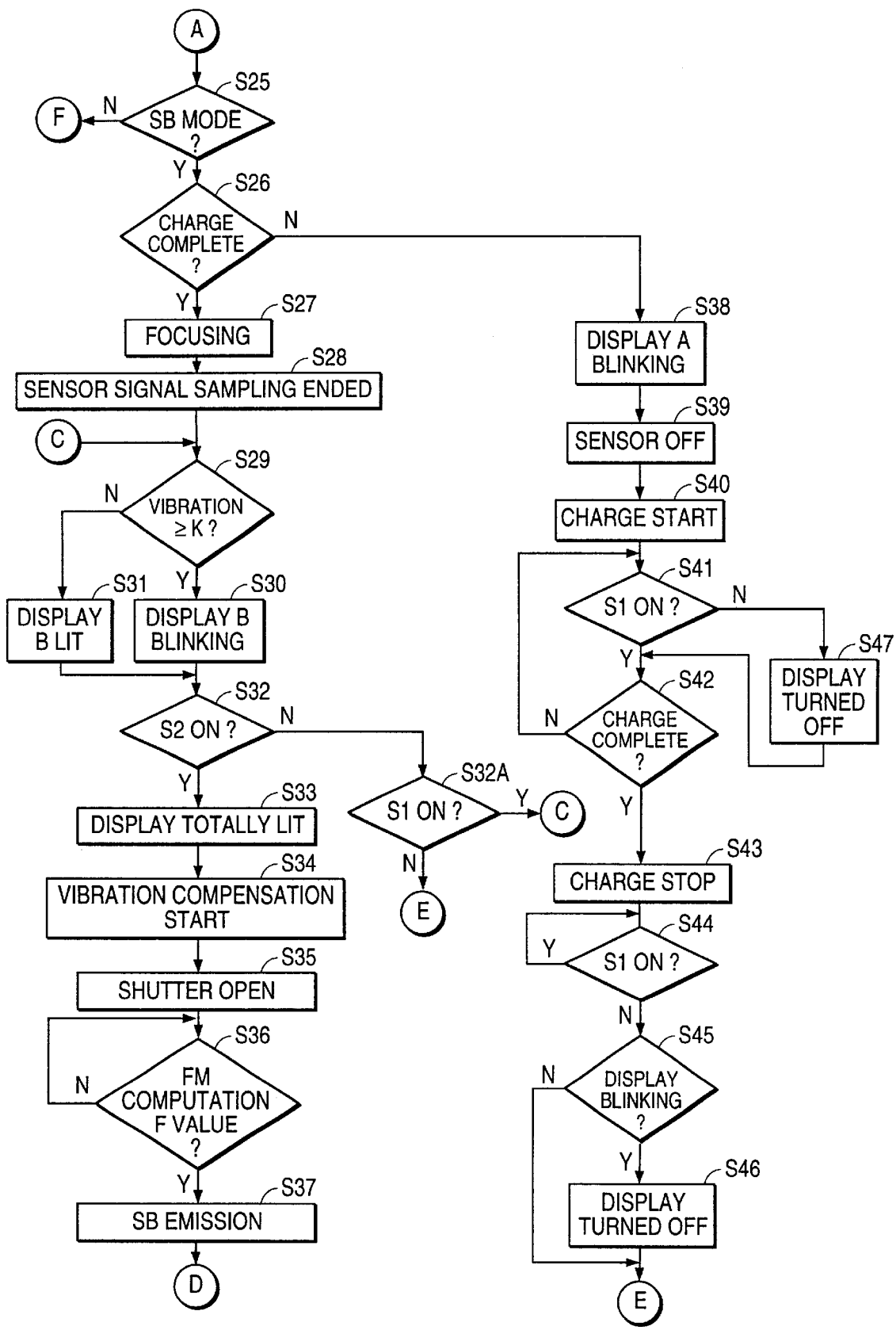
FIG. 3 is a flow chart which is a continuation of the flow chart set forth in FIG. 2.

In step S14, the amount of extension required by the focusing lens is computed, based on the rangefinding results, and thereafter the operation proceeds to step S25 in FIG. 3.

In step S25, the photometry results are used to determine whether a strobe emission ("SB") is needed, and if it is, the operation proceeds to step S26. In step S26 a determination is made as to whether the strobe battery is charged. If the strobe battery is charged, the operation proceeds to step S27 and the focusing operation is performed. If, in step S26, the strobe battery has not finished charging the operation proceeds to step S38, and the display A is made to blink. In step S39 the vibration detection unit 1 ("Sensor") is turned OFF.

Thereafter, in step S40 the strobe battery is started charging. In step S41, the switch S1 is checked. If the switch S1 is ON, the charge of the strobe battery is once again checked in step S42. If the strobe battery is charged, charging is stopped in S43. If, in step S41, the switch S41 is OFF, the display A is extinguished in step S43, and the operation proceeds to step S42.

Thereafter, in step S44, the switch S1 is checked. Once the switch S1 is ON, the operation proceeds to step S45. In step S45, the display A is checked to determine if it is still blinking. If the display A is blinking it is extinguished in step S46. In either event, the operation returns to step S2.

Thus, in steps S26 through S46, when a determination is made that the strobe is uncharged when the vibration detection unit 1 is ON, the vibration detection unit 1 is turned OFF, and a charging operation is performed. Therefore, there is no drop in the drive voltage supplied to the vibration detection unit 1 and a drop in the performance of the vibration compensation device is avoided.

When the strobe emitting battery is charged in step S26, the operation proceeds to step S27 and focusing is performed. Thereafter in step S28, vibration sampling is ended, a vibration reference level is determined, and the vibration detection operation is started.

In step S29, the amount of the vibrations, detected by the vibration detection unit 1, are compared to a preset value K. When the vibrations are larger than K, the display B is made to blink in step S30, so as to issue a warning to the photographer. When the vibrations are smaller than K, the display B is lit in step S31. In either event the operation then proceeds to step S32, and the switch SW2, abbreviated S2 in FIGS. 3 and 4, is checked.

If, in step S32, the switch SW2 is ON, the displays A and B are extinguished in step S33, and the vibration compensation unit 4 is started in step S34. Thereafter, in step S35 a shutter is opened to begin exposure. In step S36, a determination is made as to whether the aperture value (F value) of the FM computation value has been reached, and when the specified value is reached, the strobe (SB) is emitted in step S37. Thereafter, the operation proceeds to step S63 in FIG. 5.

If, in step S32, the switch SW2 is OFF, the switch SW1 is checked in step S32A, and when the switch SW1 is ON, the operation returns to step S29; otherwise the operation returns to step S2.

Figure 4:
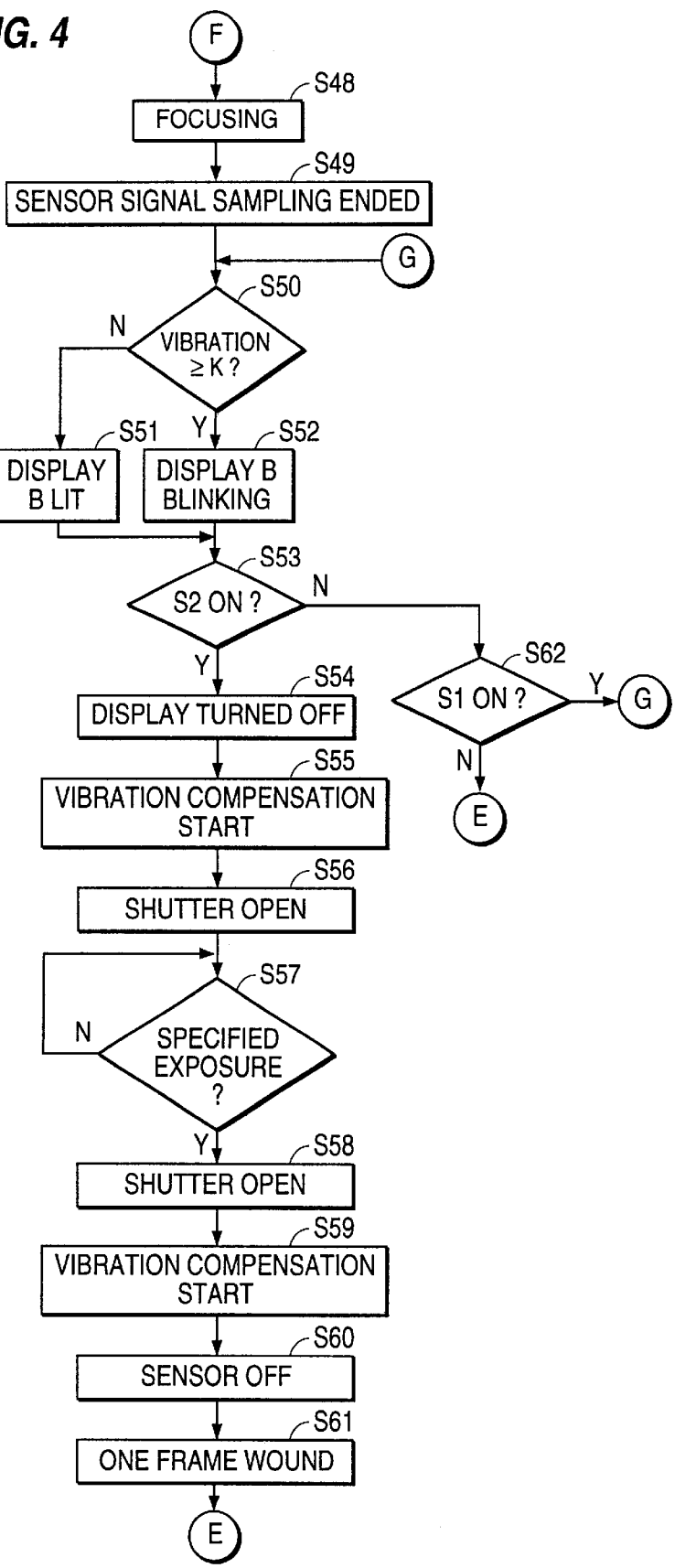
FIG. 4 is a flow chart which is a continuation of the flow charts set forth in FIGS. 2 and 3.

If, in step S25 the strobe mode is not in effect, the operation proceeds to step S48 in FIG. 4, and focusing is performed. Thereafter, in step S49 sampling of the sensor signal for computing the vibration reference level is ended and vibration detection is started. Thereafter, in S50, the amount of the vibrations detected by the vibration detection unit 1 are compared to a preset value K. When the vibrations are larger than K, the display B is made to blink in step S52, so as to issue a warning to the photographer. When the vibrations are smaller than K, the display B is lit in step S51. In either event the operation then proceeds to step S53, and the switch SW2 is checked.

If, in step S53, the switch SW2 is ON, the displays A and B are extinguished in step S54, and vibration compensation unit 4 is started in step S55. Thereafter, in step S56 a shutter is opened to begin exposure. In step S57 a determination is made as to whether the exposure has reached a specified value, and if it has reached a specified value, the shutter is closed in S58. Thereafter, vibration compensation unit 4 is stopped in step S59, the vibration detection unit 1 is turned OFF in step S60, and one frame of film is wound in step S61. Then, the operation returns to step S2 in FIG. 2, and there is standby so that the next photographic operation can be handled.

If, in step S53 the switch SW2 is OFF, the switch SW1 is checked in step S62. If the switch SW1 is ON, the operation returns to step S50; otherwise one operation returns to step S2.

Figure 5:
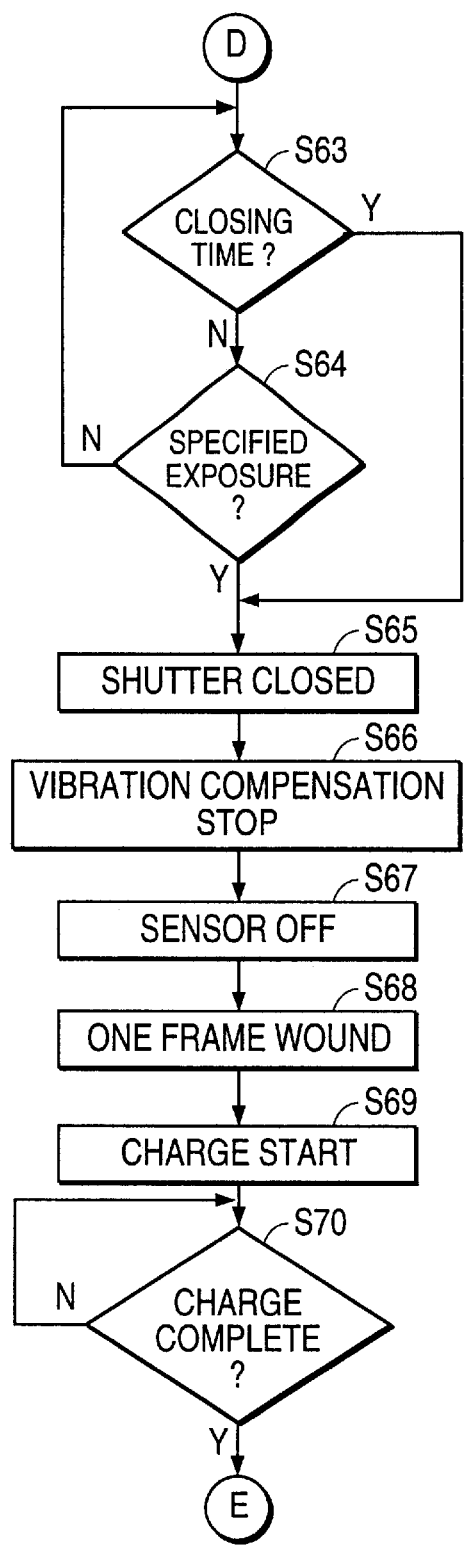
FIG. 5 is a flow chart which is a continuation of the flow charts set forth in FIGS. 2 through 4.

After strobe emission is performed in step S37 in FIG. 3, the operation proceeds to step S63 in FIG. 5, and a determination is made as to whether the shutter closing time has been reached. If the shutter closing time has not been reached, the operation proceeds to step S64 and a determination is made as to whether a specified exposure time has been reached. If the specified exposure time has not been reached, the operation returns to step S63. Once either the shutter closing time or the specified exposure has been reached the operation proceeds to step S65 and the shutter is closed, thereby ending the exposure.

After the shutter has been closed, the vibration compensation unit 4 is stopped in step S66, and the vibration detection unit 1 is stopped in S67. One frame of film is wound in step S62. Thereafter, charging is started in step S69, and once charging has been completed in step S70, the operation returns to step S2 in the aforementioned FIG. 2.

Although the preferred embodiment of the present invention has been described with respect to a specific configuration, it will be recognized that the preferred embodiment is not limited to the specific configuration. For example, in the preferred embodiment charging time cannot be checked unless charging is attempted for a brief period of time. Therefore, it is permissible charge the strobe battery for a short period of time, such that, vibration detection is not impeded. Also, in the case where the release button is turned ON, during the charging operation, immediately after the power supply is turned ON, in order to perform the photographic operation, the operations from step S6 and thereafter are performed and charging may be stopped by turning the half-press switch SW1 ON in order to implement the vibration detection operation.

Also, embodiments of the present invention may be equipped with a photometric unit 7, which measures the subject brightness for determining the exposure, configured in such a way that, it stops the operation of the vibration detection unit 1 if the camera has judged that photographic fill-in light is needed and the strobe battery is uncharged.

Moreover, the photometric unit 7 may also be configured so that it also uses an operation stop command signal generating unit contained in the vibration detection unit 1 as a vibration start signal generating unit, so as to simplify construction.

In accordance with the embodiments of the present invention as described above, after it has been judged that the strobe battery is uncharged, and the vibration detection unit has been turned OFF, charging starts, and if the shutter half-press operation status continues, exposure is not started, even if charging is completed. Thus, there is no danger that photography will be performed while vibration detection is not being performed. That is, if the half-press operation is not repeated once the shutter has been released, exposure is not performed.

To express this another way, in accordance with embodiments of the present invention, charging of the strobe battery is prohibited during vibration detection, and when the strobe battery needs charging during vibration detection, vibration detection is interrupted, and the exposure operation is provided. Thus, in the case of strobe emission photography, since vibration detection is always performed when the strobe emitting battery is charged, vibration detection and vibration compensation accuracy is improved.

Further, because photography is not executed and vibration detection is stopped when the strobe is uncharged, and because power is supplied only when the strobe is charged, electric power will not be wastefully consumed.

Although a preferred embodiments of the present invention have been shown and described, it would be appreciated by those skilled in the art that changes may be made in the embodiment without departing from the principles and spirit of the invention, the scope of which is defined in the claims and their equivalents.

What is claimed is:

1. A camera comprising:
   a vibration detection sensor which detects vibrations in the camera;
   a strobe emitter which emits light during an exposure when a strobe mode, set in accordance with a photometry process, is in effect;
   a strobe battery which supplies power to said strobe emitter; and
   a controller which determines whether the strobe battery needs charging and which:
      when the strobe mode is in effect and said strobe battery requires charging, deactivates said vibration detection sensor in conjunction with causing said strobe battery to charge, thereafter once the strobe battery is charged said controller activates said vibration detection sensor;
      when said vibration sensor is active, deactivates said vibration detection sensor upon receipt of a deactivation signal; and
      when the strobe mode is not in effect, said controller does not deactivate said vibration detection sensor, even if said strobe battery requires charging, and causes a vibration detection operation to be performed prior to charging of the strobe battery.

2. A camera, according to claim 1, further comprising:
   a release button which, when fully depressed initiates an exposure, and when partially depressed initiates activation of said vibration detector sensor.

3. A camera, according to claim 2, further comprising:
   a vibration compensator which when said release button is fully depressed compensates for vibrations detected by said vibration detection sensor.

4. A camera, according to claim 1, wherein once said controller determines that the strobe mode is not in effect, said controller does not does not further determine whether the strobe battery requires charging.

5. A camera, according to claim 1, wherein said controller maintains the active state of said vibration detection sensor when the strobe mode is not in effect until an exposure has been completed.

6. A camera comprising:
   a vibration detection sensor which detects vibrations in the camera;
   a release button which when fully depressed initiates an exposure and when partially depressed initiates activation of said vibration detection sensor;
   a strobe emitter which emits light during exposure when a strobe mode, set in accordance with a photometry process, is in effect;
   a strobe battery which supplies power to said strobe emitter; and
   a controller which:
      when the strobe mode is not in effect and the release button is partially pressed activates said vibration detection sensor;
      when said vibration sensor is active, deactivates said vibration detection sensor upon receipt of a deactivation signal; and
      when the strobe mode is in effect and the release button is partially pressed determines if said strobe battery needs charging and when said strobe battery needs charging deactivates said vibration detection sensor and initiates charging of said strobe battery, thereafter once said strobe battery is charged said controller activates said vibration detection sensor,
      and when the strobe mode is not in effect, said controller causes a vibration detection operation to be performed prior to charging of the strobe battery.

7. A computer readable medium encoded with a program for a controller in a camera having a vibration detector, a strobe emitter, and a strobe battery, the program comprising the following procedures:
   determining whether the strobe battery requires charging;
   deactivating the vibration detector when, a deactivation signal is received or, a strobe mode, set in accordance with a photometry process, is in effect and the strobe battery requires charging;
   if the the vibration detector is deactivated while charging the strobe battery, activating the vibration detector when the strobe battery is charged;
   activating, or maintaining the activation of, the vibration detector when the strobe mode is not in effect, even if the strobe battery requires charging, and performing a vibration detection operation; and
   charging the strobe battery after the vibration detection operation.

8. A method of controlling a camera having a vibration detector, a strobe emitter, and a strobe battery, the method comprising the following steps:
   determining whether the strobe battery requires charging;
   deactivating the vibration detector when a deactivation signal is received or, a strobe mode, set in accordance with a photometry process, is in effect and the strobe battery requires charging;
   if the vibration detector is deactivated while charging the strobe battery, activating the vibration detector when the strobe battery is charged;

activating, or maintaining the activation of, the vibration detector when the strobe mode is not in effect, even if the strobe battery requires charging, and performing a vibration detection operation; and charging the strobe battery after the vibration detection operation.

9. A camera, comprising:

a vibration detection sensor to detect vibration in the camera;

a strobe emitter to emit light during an exposure in response to activation of a strobe mode;

a strobe battery to supply power to the strobe emitter;

a charger device to charge the strobe battery;

a display to light during strobe battery charging;

a first discrimination device to stop a strobe battery charging operation and to output a signal to activate the vibration detection sensor to perform vibration detection;

a second discrimination device to stop operation of the vibration detection sensor and to output a signal to activate charging of the strobe battery; and a controller to control the charger device to stop a strobe battery charging operation and to control the vibration detection sensor to detect vibration in response to the signal from the first discrimination device and to control the charger to perform strobe battery charging after the vibration detection, to control the charger to perform a strobe battery charging operation and to stop the vibration detection sensor operation in response to the signal from the second discrimination device, and to control the display to light in response to the signal from the second discrimination device.

10. A camera as recited in claim 9, wherein the first discrimination device is a release button, and activation of the vibration detection sensor is initiated in response to partial depression of the release button, and exposure is initiated in response to full depression of the release button.

11. A camera as recited in claim 9, wherein the second discrimination device discriminates whether strobe light emission is needed in response to a photometry result, and activates a strobe mode in response to discrimination that the strobe light emission is needed.

* * * * *